US007823059B2

(12) United States Patent
Hodgkinson

(10) Patent No.: US 7,823,059 B2
(45) Date of Patent: Oct. 26, 2010

(54) DEFERRED INTERNET PAGE DISPLAY REFORMATTING

(75) Inventor: Andrew Hodgkinson, Cambridge (GB)

(73) Assignee: Pace PLC., Saltaire, Shipley (GB)

( * ) Notice: Subject to any disclaimer, the term of this patent is extended or adjusted under 35 U.S.C. 154(b) by 705 days.

(21) Appl. No.: 09/920,242

(22) Filed: Aug. 1, 2001

(65) Prior Publication Data

US 2002/0016802 A1    Feb. 7, 2002

(30) Foreign Application Priority Data

Aug. 7, 2000    (GB)    .................................. 0019151.0

(51) Int. Cl.
*G06N 3/00* (2006.01)
(52) U.S. Cl. .................................................... 715/234
(58) Field of Classification Search ................ 715/526, 715/513, 523, 517, 530, 234, 243, 253, 254; 345/335, 340
See application file for complete search history.

(56) References Cited

U.S. PATENT DOCUMENTS

| 5,778,372 | A | | 7/1998 | Cordell et al. | ............... 707/100 |
|---|---|---|---|---|---|
| 5,845,084 | A | * | 12/1998 | Cordell et al. | ............... 709/234 |
| 5,894,554 | A | * | 4/1999 | Lowery et al. | ............... 709/203 |
| 5,918,239 | A | | 6/1999 | Allen et al. | .................. 707/526 |
| 6,085,226 | A | * | 7/2000 | Horvitz | ...................... 709/203 |
| 6,094,662 | A | | 7/2000 | Hawes | ......................... 707/104 |
| 6,128,655 | A | * | 10/2000 | Fields et al. | ................. 709/219 |
| 6,226,642 | B1 | * | 5/2001 | Beranek et al. | ............. 709/219 |
| 6,643,641 | B1 | * | 11/2003 | Snyder | ........................... 707/4 |
| 6,665,642 | B2 | * | 12/2003 | Kanevsky et al. | ........... 704/260 |
| 7,120,871 | B1 | * | 10/2006 | Harrington | ................... 715/205 |
| 2002/0004803 | A1 | * | 1/2002 | Serebrennikov | ............. 707/513 |

* cited by examiner

*Primary Examiner*—Kyle R Stork
(74) *Attorney, Agent, or Firm*—Head, Johnson & Kachigian, P.C.

(57) ABSTRACT

The invention relates to the generation of user selected pages from an internet site and the delay in the reformatting of the same following a user selection of a new data event i.e. the selection of a new page which is to be displayed. In accordance with the invention, upon a user selection, reformatting of the page is delayed either for a predesignated time interval from the previous page reformatting or until all or a predefined amount of the data for the new page has been received. This allows the processor to be controlled hence preventing delays and/or errors in navigational functions and also can reduce the generation of "flicker" on the on-screen display.

5 Claims, 6 Drawing Sheets

DEFERRED INTERNET PAGE DISPLAY REFORMATTING

CROSS REFERENCE TO RELATED APPLICATION

This application claims priority to British Patent Application No. 0019151.0 filed 7 Aug. 2000.

The invention to which this application relates is an improved method for the generation of pages for an internet website on a display screen and particularly, although not necessarily exclusively, to the generation of pages using apparatus with relatively limited processing capability.

When fetching pages, Personal Computer (PC) based web browser facilities tend to search for and fetch the data for a selected internet web page and then display the display generated from the fetched data as soon as they can. On devices with processor power and random access memory (RAM) available, this is typically the best approach, with memory of a sufficient size to allow data for a whole internet page display being capable of being stored. The ability to store data for the whole-window can be used to avoid a "flickering" display on the display screen so that reformatting of the page being displayed takes place almost instantaneously and without affecting the use of the page by the user as the page reformats and is updated.

However web browser facilities are not always provided in PC apparatus and can be usefully provided in other apparatus such as television apparatus and with apparatus such as broadcast data receivers (BDRs). The BDR can be provided as an integral part of a television set or can be provided in connection therewith. The BDR's main function is to receive data broadcast from a remote location typically by a broadcaster or broadcast provided and the data can be transmitted by any of cable, satellite or terrestrial broadcast systems. When the data is received the BDR decodes and processes the data to allow the generation of television and/or radio programs and/or auxiliary information which can all be selectively displayed via the television set. The BDR is typically also provided with a link to a telecommunications network and there is the ability to provide other user selectable functions such as the provision of an internet web browser facility which can be operated via the broadcast data receiver and the information displayed on the television set display screen. While this function is found to be popular with users the BDR has significantly less processor power and RAM than that provided in a PC and, if, for example, a user is trying to navigate through links on a displayed web page via a remote control handset rather than a mouse controller, frequent reformatting of the page displayed is much less desirable as some of the limited processor power is used by the reformat process which can lead to jerky and unreliable navigation for the user due to the processor power only being partially available, due to the occurrence of the reformatting. Furthermore, there is often no method of providing a data backing store or memory to alleviate the "flickering" display as the reformatted page is redrawn and updated.

This problem is not limited to BDR's and even on relatively powerful desktop systems with backing stores, the frequent "reshuffling" display effect seen when fetching some web sites can become annoying for the user.

Thus, while the conventional web browsers reformat of a web page whenever new page or image data arrives is acceptable in the conventional PC based systems, as the provision of the web browser into other apparatus occurs, so it is found that the rapid reformats which conventionally would be performed increase the processor power usage during page fetching and which can in turn lead to more redraws or reformats of the page displayed and can hinder user navigation of the page via highlight-based (e.g. infra-red handset) navigation systems of the type used in the BDR.

SUMMARY OF THE INVENTION

The aim of the present invention is to provide a system which allows a web browser facility to be usable but without the need for the displayed web page to be reformatted instantaneously.

In a first aspect of the invention there is provided an internet web browser facility, said facility capable of identifying and obtaining data for a web page in response to a user instruction and processing the received data to generate and display the web page on a display screen connected thereto and characterized in that when the web page has been selected and the data is being received the reformatting of the displayed web page is controlled so as to occur only after a predetermined time has elapsed since the previous web page reformat and/or after a predetermined event has occurred.

By allowing the reformatting of the displayed web page to be stopped from occurring as the data is received as is conventionally the case and instead providing a reformatting deferring system so the use of the processor power is controlled and the "flickering" effect which can be caused on the display is reduced.

In one embodiment the system prevents the reformatting of the displayed page until a prefixed time interval has elapsed regardless of any other events occurring and rather than the conventional occurrence of reformatting whenever new page or image data arrives.

In one embodiment when a reformat is required for the first group of data fetched for a page, it is carried out immediately to give the user the earliest possible indication of progress.

In one embodiment when an event occurs in the reception of data that would conventionally cause an immediate reformat of the web page the system notes of the highest point or level in the displayed page that would be affected by the reformat and starts a timer. Thus, no reformatting is then allowed until the timer has reached zero, or another predetermined time interval, and/or the data for the entire required page fetch is completed. This latter predetermined event is deemed to have been completed when the data which allows the changes up to the previously noted highest point or level has been received.

When the time interval has elapsed or the entire data fetch is complete as required, the reformatting of the displayed page can occur and the parts of the page which need to be changed in response to the newly received data are reformatted.

Thus, rather than continuous reformatting the number of reformats that will occur during a page fetch, particularly when using a modem or if the HTML source of the page includes images, but gives no indication of their size, is significantly reduced.

Furthermore, this in turn means that, in total, less processor power is used during the fetch process and the use of the web browser facility proceeds more smoothly from the user's perspective.

In accordance with a further aspect of the invention there is provided a management system for the operation of an on screen page display which is generated from a user selected internet site, said system including a deferring system which prevents the web browser from reformatting pages during the reception of data each time the display page layout needs to change in response to a user selection characterized in that the web browser reformats at no more often than a predesignated time interval or when a predetermined amount of the data for the new page has been received.

In one embodiment when a new data event occurs that would normally cause an immediate page reformat, the browser takes note of the highest point in the page that would be affected and starts a time and no reformat occurs until a predesignated time elapses. Typically the reformat is delayed for the duration of a predesignated time period from the occurrence of a user selection. In addition or alternatively the reformat is delayed until all data for the entire page is received.

Typically upon a user selection, the processor performs the data reception function only, for a predesignated period of time.

In one embodiment the system is incorporated in a processor of a broadcast data receiver which includes the internet access function which is user selectable.

BRIEF DESCRIPTION OF THE DRAWINGS

A specific embodiment of the invention is now described as follows, with reference to the accompanying drawings; wherein.

DESCRIPTION OF THE PREFERRED EMBODIMENTS

Figure 1:
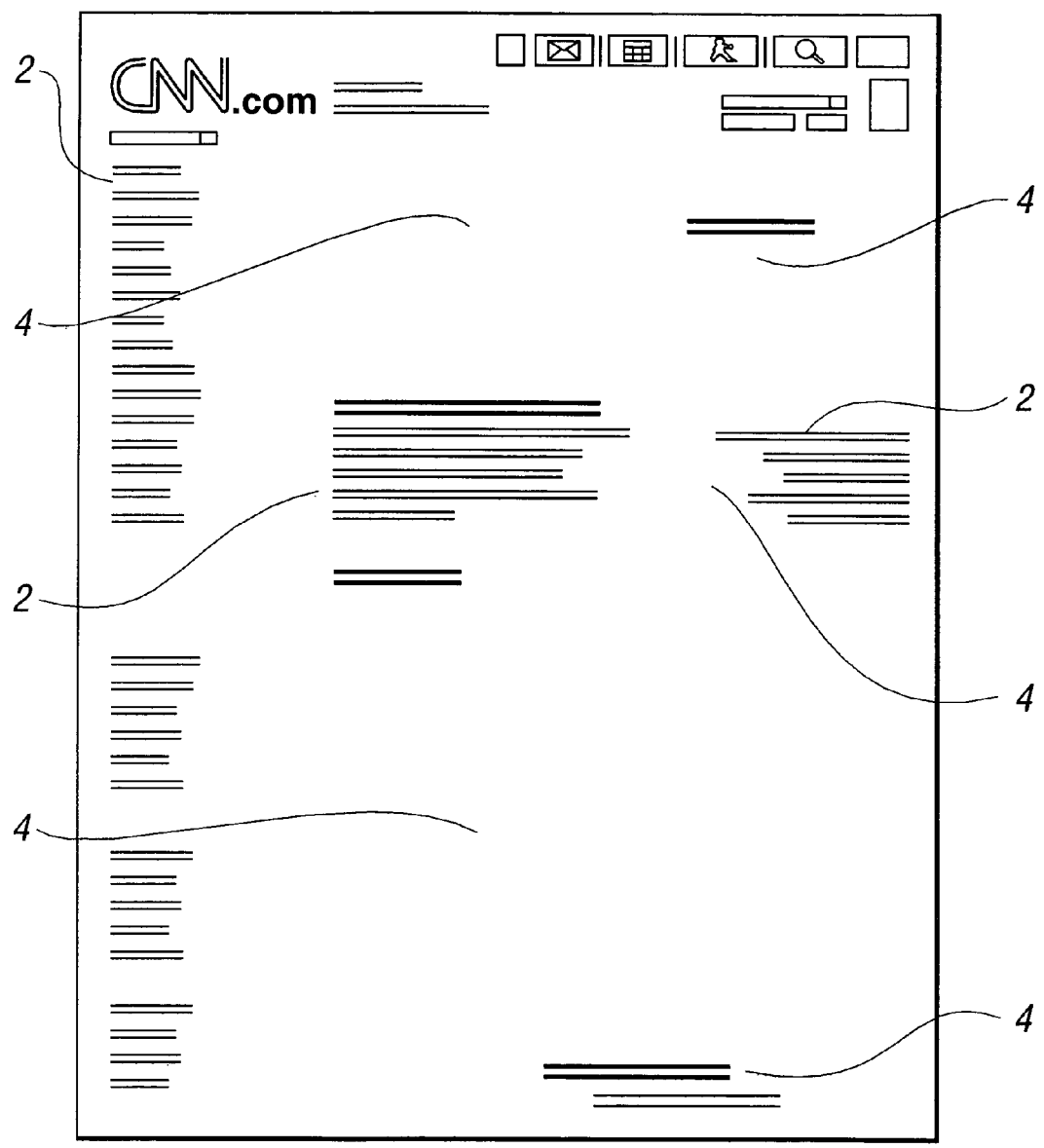
FIGS. 1-3 illustrate a method of internet web page display reformatting in accordance with a conventional system.

The Internet web browser function is, in the embodiment of the invention now described, provided as part of a BDR and when selected by the user of the BDR is operational to retrieve and process data leading to the generation of a user selected internet web page. The BDR receives data for television and radio programs and auxiliary displays on a television set or similar, via satellite, cable or terrestrial systems. Data can also be received via communications link such as a telecommunications or cable link.

BDR's are typically provided in the living rooms or relaxing areas of domestic premises and, as such, are in many instances more likely to be used than PC's in the average household. The BDR's also employ remote control handsets with which most people are familiar and through this ease of use and familiarity an internet access function is now increasingly being provided in the BDR. However the BDR is commonly limited in terms of available memory, processor power and/or display possibilities with respect to the PC and the aim of this invention is to overcome one common problem when an internet web browser facility is provided in this form of apparatus.

During the retrieval of the data for a selected page the web browser function can be required to reformat the display of the page during fetching and generation for several reasons, two of which are:

1) New page data arrives. This is particularly problematic for pages based heavily on Hyper Text Mark-up Language (HTML) tables.
2) New image data arrives. If the HTML including the images gives no indication of their sizes, the browser has to use a standard sized placeholder and then reformat the page to fit the actual image size once enough of the image data is fetched to work its dimensions out.

This invention solves problems associated with these two reasons. Repeated reformatting, particularly if data is arriving in many small groups punctuated by short delays, can lead to a lot of flickering of the page display on screen, especially as the web browser function when provided as part of a BDR device, typically has insufficient RAM and/or processor power to implement a storage system where all the data for the page is stored in memory and then displayed. Thus, the occurrence of many reformats, typically for relatively trivial data changes can only be conventionally dealt with by the provision of relatively expensive high capacity memory.

In addition, with a BDR based web browser function the user typically uses the remote control apparatus which is used to perform the conventional "television" control functions to navigate across a displayed web page. This is typically achieved by the highlighting of parts of the display to indicate the relative position of the user "cursor" on the display screen and hence the displayed web page. The occurrence of repeated reformats can make the navigation on images on the page displayed jerky. It can also become unreliable; for example, the user might be about to select a link when the part of the page it was in is reformatted and which can lead to an incorrect choice being selected.

The reformat control system in accordance with the invention reduces the chance of the frequent formatting.

On modem based internet functions, small groups of page data followed by small delays are often experienced as the data is retrieved via the modem. In this case the problems indicated with respect to the flickering effect on the display can then become particularly problematic, especially if the data being received is to be used in the generation for display as part of a large table that takes large amounts of processor power to resize each time data is added.

When the web browser function is provided on apparatus with relatively fast communication links, the page data size and the flickering effect can be reduced so as to be less significant compared to the link speed but this causes another problem with respect to navigation. Images often fetch in rapid succession, and if the HTML including those images gives no indication of their sizes then rapid, repeated reformatting can take place with traditional web browser layout methods.

In accordance with the invention, the reformatting is deferred in the following manner.

When a user selects via the web browser function to view a particular page, the system starts to retrieve the data via the communications link. When a first portion of the data is received which is sufficient to allow the new page to be at least partially displayed, the existing display on screen, is reformatted to indicate to the user that the selection has been identified and the data for the new selected page is starting to be received.

However if further data is received, then the next time the page needs to be reformatted for any reason, the y-coordinate of the topmost part of the page that is affected is stored and a timer is started. At this stage no reformatting of the displayed page occurs. Once the timer is running, any further data received during that time does not cause the reformatting of the page but rather the data is stored. However the calculation of the topmost y co-ordinate which would be affected by the newly received data is recalculated, and if the co-ordinate is higher, this replaces the previous value.

When the time period elapses, the web browser is allowed to carry out the page reformat from the top y-co ordinate level where possible. Some web browsers are restricted by internal design to only be able to lay out all of the page data fetched at that point in one operation and in these cases this is what will be done, but this is not as efficient as only reformatting those parts that have changed. Thus, the reformatting which occurs includes all of the changes that are required as a result of the data received during the time period and which changes were deferred for the duration of the time period. All new page data fetched is included thus avoiding multiple reformats as each portion of new data comes in, and all image sizes known up to that point are incorporated in the new layout.

The length of the time interval during which reformatting is deferred is chosen to balance frequency of reformatting against showing the user progress in the page fetch. The time interval is preferably chosen on a per-application, not per-page basis; for example, a slow communication link may work better with a longer time interval, so as much page data as possible is assembled before a reformat, whereas if a faster communication link is achieved the system can work better with a shorter time interval but not so short that a flicker problem reappears.

In use, and as an example, it is found that time intervals of less than four seconds tend to have little benefit over no delay at all, and values of more than fifteen to twenty seconds may make users believe the retrieval of the data for the web page as stopped altogether.

Furthermore, since the time interval length is not critical, the software providing the timer facility does not have to provide a particularly accurate timer facility. This can be useful for operating systems where there is a limit on the number of different facilities which can use any high accuracy timing facility provided.

In one embodiment, if during the time interval, data is received which would allow the whole page, including images, or any other predefined level of data, to be performed, the time interval delay can be overridden and an immediate page display reformat is performed. This can be done in confidence that no further or relatively insignificant amounts of data will subsequently be received, thereby meaning that there is little risk of further reformatting of the page display.

It is possible that it would be desirable to also do this if the user activates an equivalent of a stop facility for the data retrieval. Generally, however, it proves more confusing for the user to see a burst of activity just as they select to stop than it does for all activity to cease, even though this means that some of the data fetched for the page will not be displayed at all.

One example is the news site http://cnn.com/ which, like many of the larger, more busy sites, uses a large tables-based layout with the HTML including many images, some of which have no size specified for them.

Figure 2:
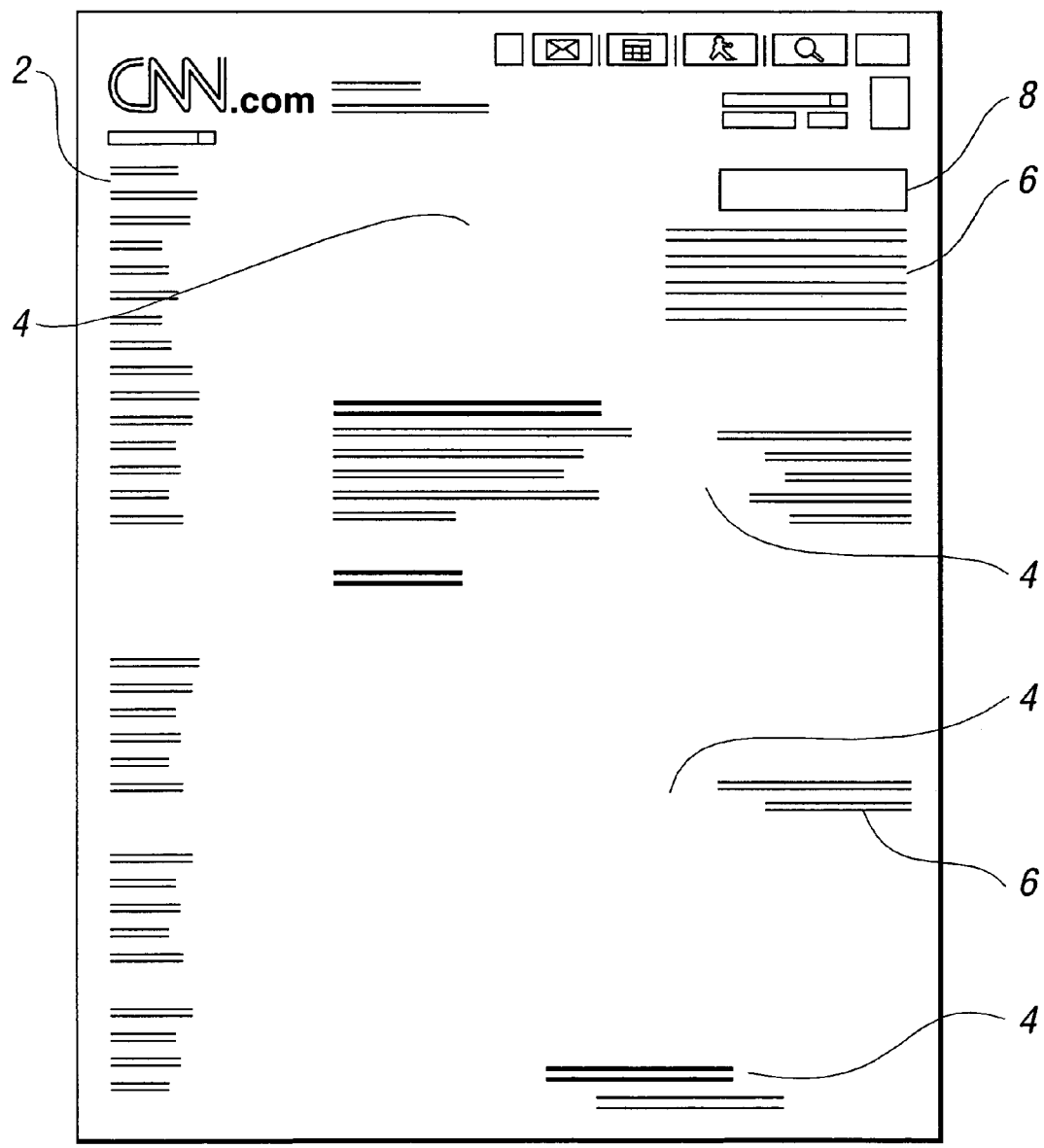
Figure 3:
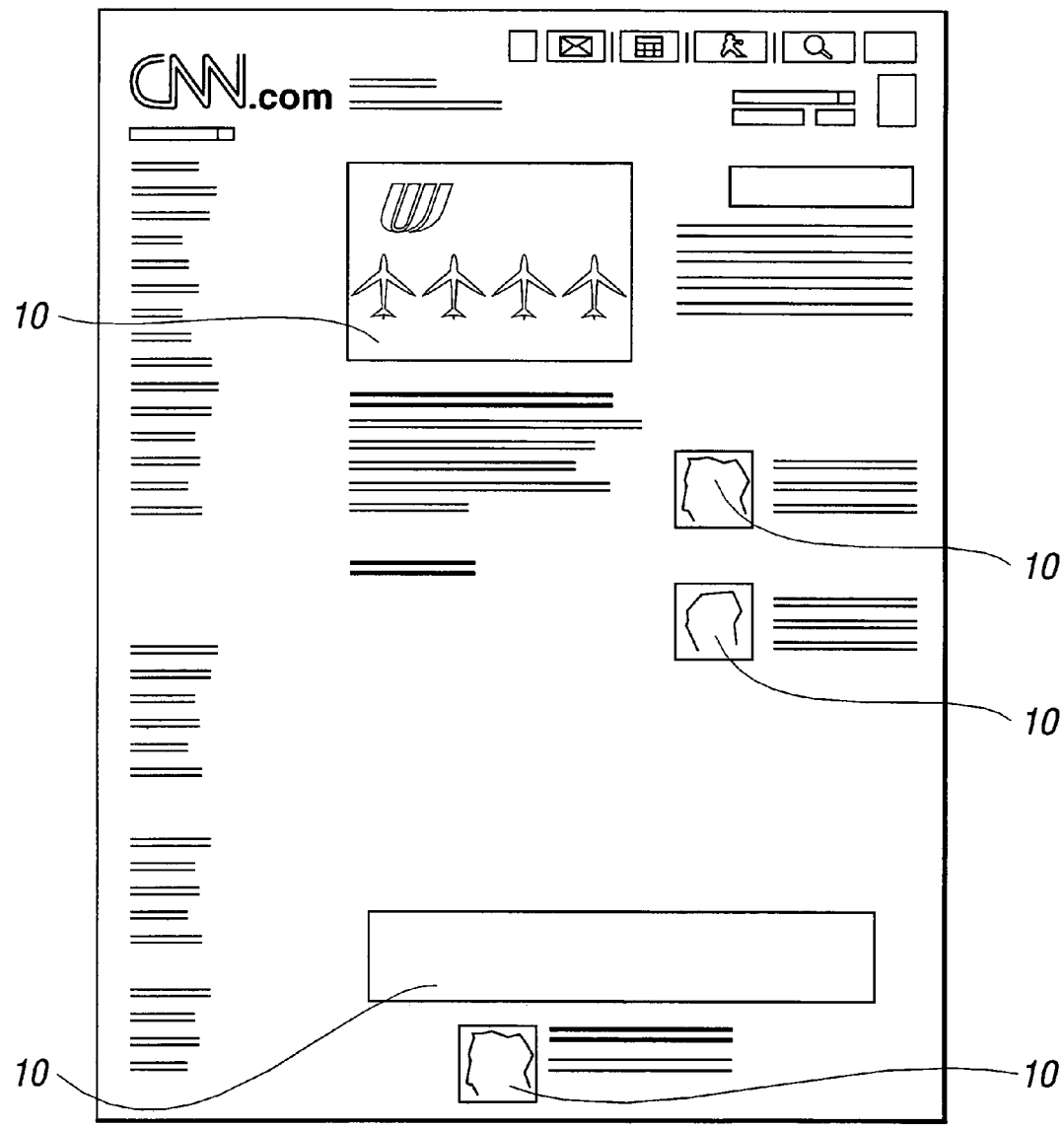

FIGS. 1-3 illustrate a portion of the first page of this web site as it would be opened in a conventional manner. In use, when the user selects the site, the web browser starts to retrieve the data and when an initial portion of data is received, the display illustrated in FIG. 1 is generated which, it can be seen includes text portions 2 but also gaps 4. As the data retrieval continues, so further data is received and every time a new data portion is retrieved a reformat of the page occurs. Thus, to illustrate this FIG. 2 illustrates a reformatted page portion with text 2, some further text 6 and display portions 8 but with still some gaps 4 remaining. This process then continues with repeated reformatting until the display shown in FIG. 3 is achieved with the remaining gaps filled with images 10. It should therefore be appreciated that although three Figures and hence two reformats are illustrated, in practice multiple reformats will take place and each time a reformat occurs a display flicker can occur and/or the navigation is affected. Some browsers even wait until all the unknown size images have arrived, which leaves the user staring at very little for a long time. Sites such as this would benefit considerably from deferring reformats in accordance with the invention as is illustrated in FIGS. 4 and 5.

Figure 4:
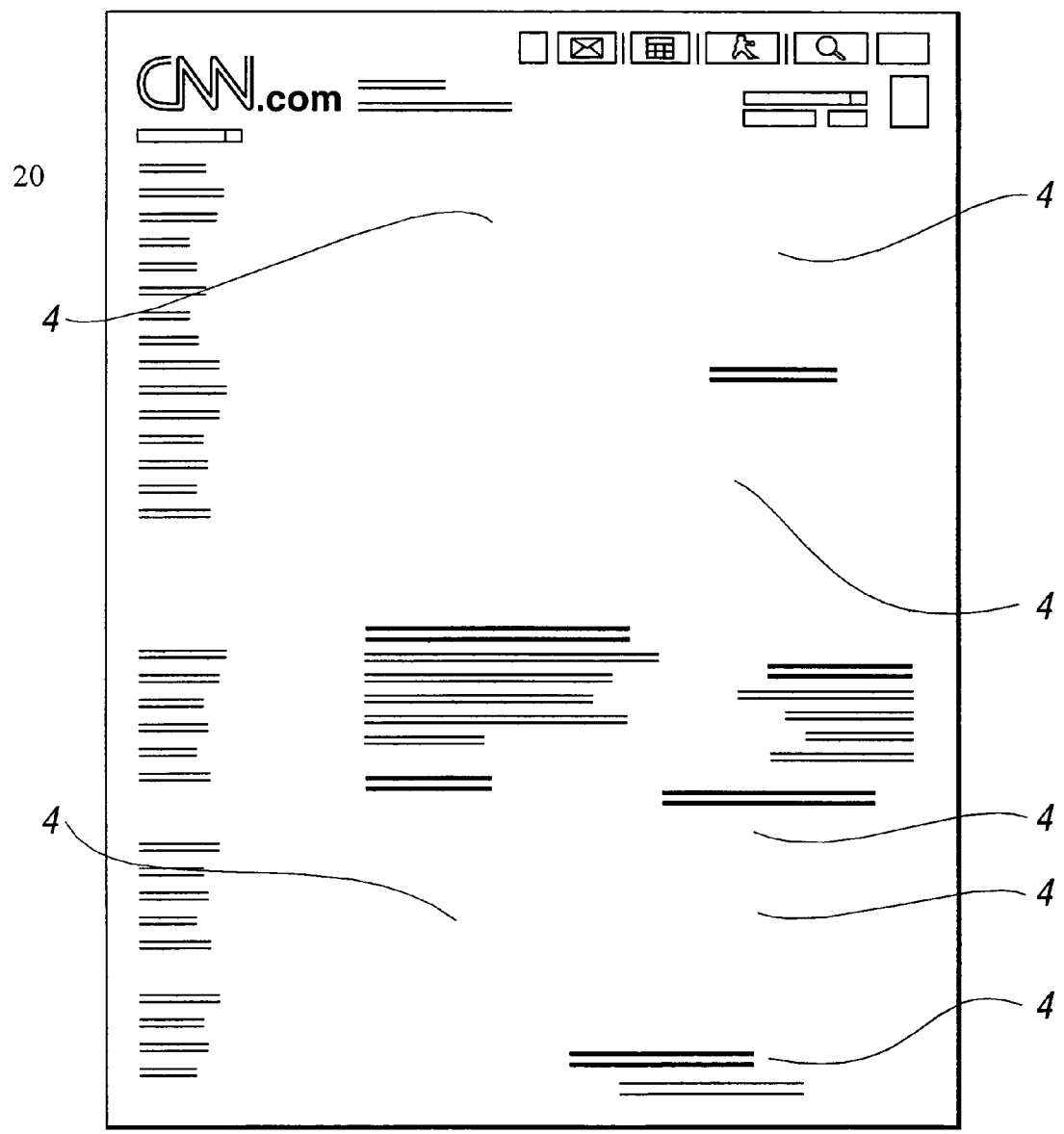
FIGS. 4 and 5 illustrate a method in accordance with the invention.
Figure 5:
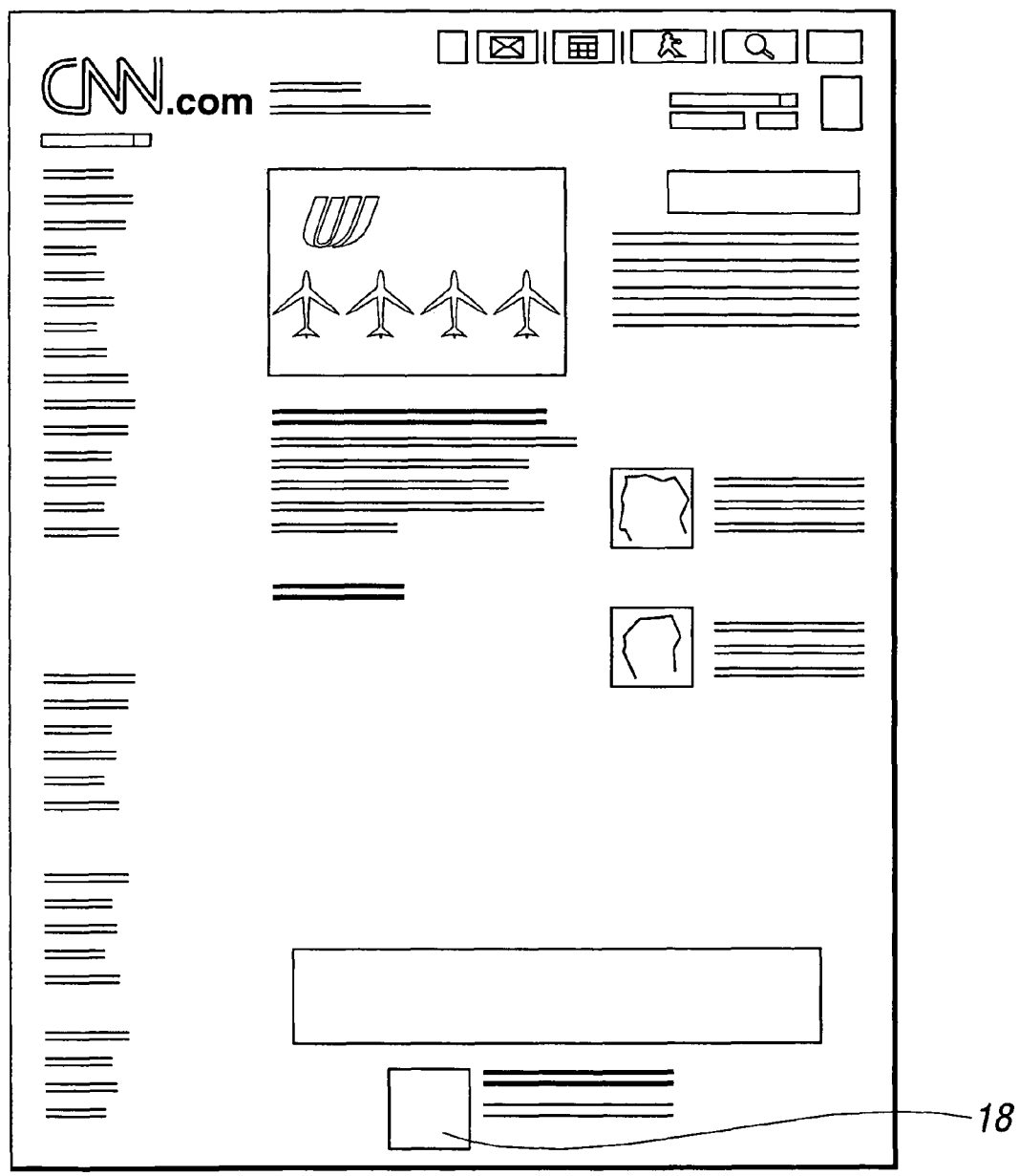
Figure 6:
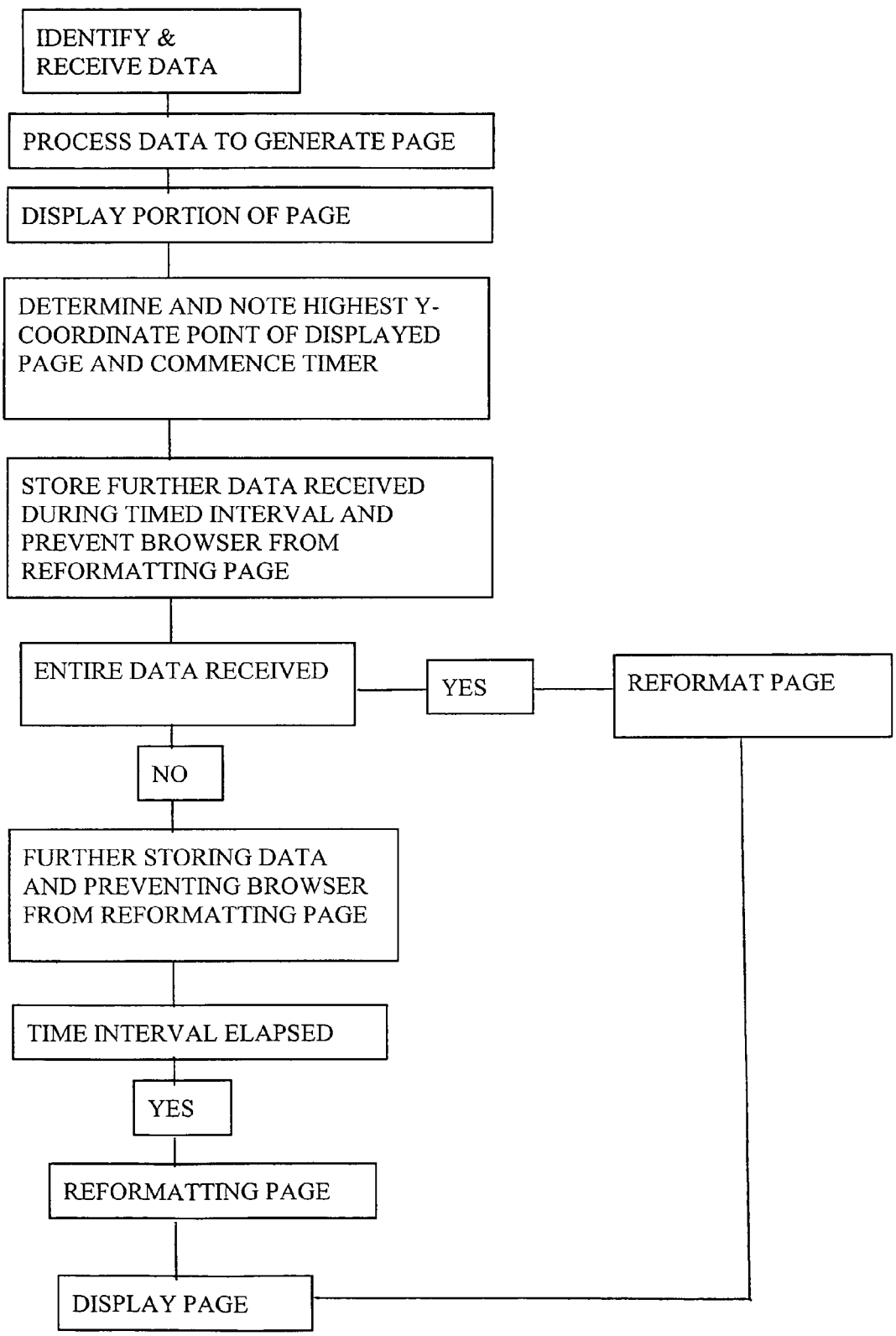
FIG. 6 is a flow chart setting forth the process of the present invention.

The same portion of the web site page is shown being generated in accordance with the invention in FIGS. 4 and 5. In accordance with the invention, the user selects the web site and when a first portion of the relevant data has been received, the display shown in FIG. 4 is generated and it will be seen that it is the same as that of FIG. 1 with gaps 4 awaiting further data. This display is generated to indicate to the user that the retrieval of the required data is under way. However as the further data is retrieved, the top level of subsequent required change is recorded which in this case would be at the level indicated by 20 and the timer facility is started and the received data is stored until the time interval elapses and no reformatting of the display occurs such that no flicker occurs and no navigation problems are encountered. Thus, when the time interval elapses a reformat of the page occurs with a significantly greater portion of data being used in the reformat such that the display of FIG. 5 is achieved with all but one of the gaps 18 completed. Thus it will be appreciated that this single reformat after the time interval changes the appearance of the display to a significantly greater amount than is the case with each reformat in the conventional method.

Reformats occur less often and encompass more changes using a the invention in comparison with the conventional method over a traditional model. Consequently, deferred reformatting can prove sufficiently beneficial that in embedded devices it becomes possible to select a lower power processor than would otherwise be required, reducing the cost of the hardware. The user of the device sees less flicker and smoother highlight-based navigation during page fetches, making the device more appealing to consumers.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. An internet web browsing method, said method comprising the steps of:
 identifying and receiving data for a web page in response to instructions from a user;
 processing said received data by a browser to generate a web page connected thereto;
 displaying at least part of said web page corresponding to a first portion of data;
 preventing the browser from reformatting the web page while the browser receives further data;
 wherein when a predetermined event occurs in the reception of data that would conventionally cause an immediate reformat of the web page, the highest y-coordinate point or level in the displayed page that would be affected by the reformat is noted and commences a time interval;
 reformatting said selected web page by the browser after said web page is selected and while further data is being received by the browser, only after:
 either a predetermined amount of data has been received by the browser,
 or after a predetermined time has elapsed since a previous reformat of that web page if said predetermined amount of data is not received within said predetermined time, wherein a reformatting of the page display can occur during the time interval if all or a predefined proportion of data for the page is received during the time interval;

said predetermined amount of data and predetermined time being specified prior to obtaining data for that web page such that the number of reformats required in displaying the web page as data is received is reduced; and displaying the reformatted web page.

2. An internet web browsing method according to claim 1 wherein sufficient data is deemed to have been received when data which would allow changes to the web page to be achieved up to the previously noted highest y-coordinate point or level has been received.

3. A broadcast data receiver including a web browser which is configured to perform the method of claim 1.

4. An internet browsing method, said method comprising the steps of:

identifying and receiving data for a web page in response to instructions from a user;

processing said received data by a browser to generate a web page;

displaying at least a part of said web page corresponding to a first portion of data;

determining and noting a highest y-coordinate point or level in the displayed portion of the web page and commencing a timer;

storing any further data received during a time interval of the time and preventing the browser from reformatting the web page while the browser receives said further data;

reformatting said selected web page from the top of said highest y-coordinate point only after a predetermined amount of data has been received by the browser or after the predetermined time interval has elapsed since a previous reformat of that web page;

said predetermined amount of data and predetermined time being specified prior to obtaining data for that web page such that the number of reformats required in displaying the web page as data is received is reduced; and displaying the reformatted web page.

5. An internet web browsing method, said method comprising the steps of:

identifying and receiving data for a web page in response to instructions from a user;

processing said received data by a browser to generate a web page;

displaying at least a first portion of said received data for said web page;

determining and noting a highest y-coordinate point or level in the displayed portion of the web page and commencing a timer with a predetermined time interval;

storing any further data received during the predetermined time interval and preventing the browser from reformatting the web page while the browser receives said further data;

overriding the timer and allowing the web page to be reformatted if a predetermined amount of data has been received;

if the timer having the predetermined time interval continues, then said selected web page is reformatted from the top of said highest y-coordinate point only after the predetermined time interval has elapsed since a previous reformat of that web page;

displaying the reformatted web page; and wherein said predetermined amount of data and said predetermined time are specified prior to obtaining data for that web page such that the number of reformats required in displaying the web page is reduced.

* * * * *